(12) United States Patent  
Nishimura

(10) Patent No.: US 11,011,007 B2  
(45) Date of Patent: May 18, 2021

(54) AUTOMATED TRANSACTION DEVICE, MONITORING DEVICE, AND AUTOMATED TRANSACTION SYSTEM INCLUDING THE AUTOMATED TRANSACTION DEVICE AND MONITORING DEVICE

(71) Applicant: Oki Electric Industry Co., Ltd., Tokyo (JP)

(72) Inventor: Kimio Nishimura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 223 days.

(21) Appl. No.: 16/311,349

(22) PCT Filed: Jun. 9, 2017

(86) PCT No.: PCT/JP2017/021550  
§ 371 (c)(1),  
(2) Date: Dec. 19, 2018

(87) PCT Pub. No.: WO2018/037673  
PCT Pub. Date: Mar. 1, 2018

(65) Prior Publication Data  
US 2019/0228606 A1    Jul. 25, 2019

(30) Foreign Application Priority Data

Aug. 23, 2016  (JP) .............................. JP2016-162380

(51) Int. Cl.
| | | |
|---|---|---|
| *G06Q 40/00* | (2012.01) | |
| *G07D 7/00* | (2016.01) | |
| *G06Q 20/18* | (2012.01) | |
| *G07F 7/04* | (2006.01) | |
| *G07D 9/00* | (2006.01) | |
| *G06Q 20/10* | (2012.01) | |

(52) U.S. Cl.  
CPC .......... *G07D 7/00* (2013.01); *G06Q 20/1085* (2013.01); *G06Q 20/18* (2013.01); *G07D 9/00* (2013.01); *G07F 7/04* (2013.01); *G07D 2207/00* (2013.01)

(58) Field of Classification Search  
CPC .......... G07D 7/00; G07D 11/009; G07D 9/00; G07F 19/202; G07F 19/20; G06Q 20/1085; G06Q 20/18  
USPC ....................................................... 235/379  
See application file for complete search history.

(56) References Cited

U.S. PATENT DOCUMENTS

2008/0195540 A1* 8/2008 Gee .................... G06Q 20/1085  
705/43  
2016/0350995 A1* 12/2016 Mizuno ................. G07D 7/004  
(Continued)

FOREIGN PATENT DOCUMENTS

JP    2004-145771 A    5/2004  
JP    2008-140122 A    6/2008  
(Continued)

*Primary Examiner* — Ahshik Kim  
(74) *Attorney, Agent, or Firm* — Rabin & Berdo, P.C.

(57) ABSTRACT

Included are a medium insertion port that accepts insertion of a medium from a customer; a determination section that determines whether or not the inserted medium is a counterfeit note; and a notification section that notifies a specific notification target selected from plural notification targets when the determination section has determined the inserted medium to be a counterfeit note.

15 Claims, 11 Drawing Sheets

(56) References Cited

U.S. PATENT DOCUMENTS

2017/0344823 A1* 11/2017 Withrow ................. G06F 21/30
2018/0032805 A1* 2/2018 Choi ........................ G06K 9/78

FOREIGN PATENT DOCUMENTS

JP     2010-102647 A    5/2010
JP     2014-063504 A    4/2014

\* cited by examiner

FIG.3A

EXAMPLE OF NOTIFICATION RECIPIENT INFORMATION

*PROFESSIONAL DUTIES: AREA OF PROFESSIONAL RESPONSIBILITY
**DISTANCE: DISTANCE BETWEEN TERMINAL AND ATM 10 IN WHICH ABNORMAL NOTE HAS BEEN INSERTED

| NOTIFICATION RECIPIENT TERMINAL ID | ADDRESS INFORMATION (EMAIL ADDRESS) | USER INFORMATION (NAME/RESPONSIBLE ATM/PROFESSIONAL DUTIES*) | STATUS INFORMATION (POWER SOURCE STATUS/ DISTANCE**) |
|---|---|---|---|
| TERMINAL A | xxxx@xxxxxx.com | DDDD/0001XX/SERVICE COUNTER | ON/10m |
| TERMINAL B | kkkk@kkkkkk.co.jp | EEEE/0001kk/SERVICE COUNTER | ON/50m |
| TERMINAL C | pppp@pppppp.com | FFFF/0001pp/CASHIER | OFF/- |
| ... | ... | ... | ... |

FIG.3B

EXAMPLE OF SUPPLEMENTARY INFORMATION

| SUPPLEMENTARY INFORMATION | CATEGORY | INFORMATION |
|---|---|---|
| ABNORMAL NOTE INFORMATION | ABNORMAL NOTES | NUMBER OF NOTES, NOTE TYPE, INSERTION TIME, SERIAL NUMBER |
| CUSTOMER INFORMATION | CUSTOMER | ACCOUNT NUMBER, TRANSACTION TYPE, TRANSACTION VALUE, TRANSACTION HISTORY |
| IDENTIFICATION INFORMATION | ATM DEVICE | DEVICE NUMBER, INSTALLATION FLOOR, BRANCH NUMBER |

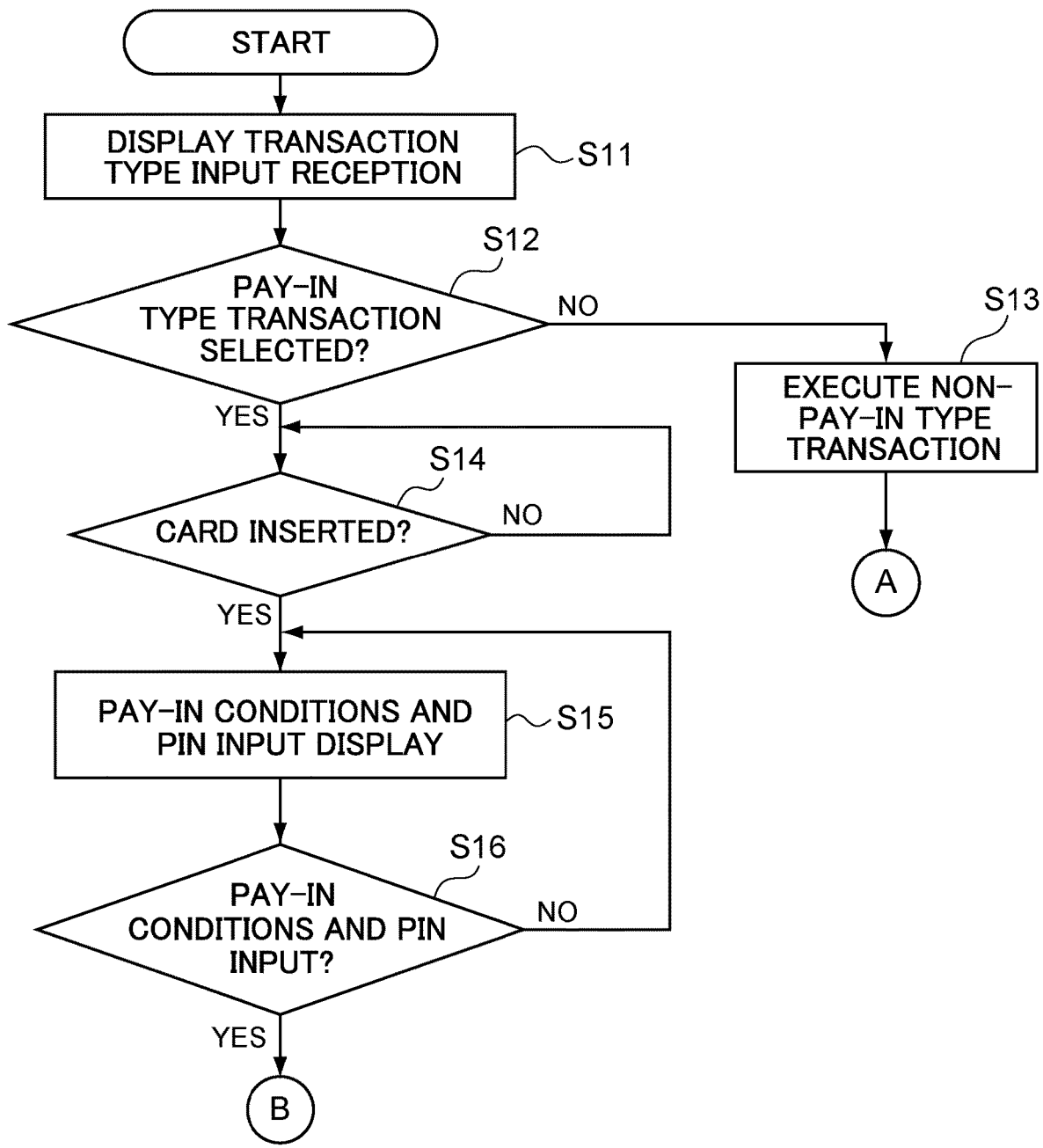

AUTOMATED TRANSACTION DEVICE, MONITORING DEVICE, AND AUTOMATED TRANSACTION SYSTEM INCLUDING THE AUTOMATED TRANSACTION DEVICE AND MONITORING DEVICE

TECHNICAL FIELD

The present invention relates to an automated transaction device, a monitoring device, and an automated transaction system including the automated transaction device and the monitoring device.

BACKGROUND ART

Typical automated transaction devices, including Automated Teller Machines (ATMs) and Cash Dispensers (CD) employed in financial institutions, employ measures to prevent the circulation of fake notes (counterfeit notes). For example, banknotes inserted by a user are inspected for authenticity, and if a fake note is detected, the fake note is retained in a dedicated cassette.

For example, Japanese Patent Application Laid-Open (JP-A) No. 2008-140122 (Patent Document 1) discloses an automated cash transaction device provided with a operation restricting means that suppresses a reduction in up-time accompanying the detection of counterfeit notes by suspending pay-in type transactions for banknotes of a denomination corresponding to a detected counterfeit note, and preserving a current state, namely suspended or ongoing, for pay-in type transactions using banknotes of other denominations. Moreover, JP-A No. 2010-102647 (Patent Document 2) discloses a paper sheet processing device that separates out counterfeit notes only.

SUMMARY OF INVENTION

Technical Problem

In automated transaction devices such as those described above, sometimes it is difficult to respond swiftly to customer questions or complaints since it takes time to ascertain the circumstances when a counterfeit note has been detected. Other examples of related issues include improving customer satisfaction with the service they receive and improving the efficiency of bank operations by swiftly ascertaining circumstances relating to a customer, including details of the customer's transaction and the customer's transaction history, when an abnormality has occurred.

In consideration of the above circumstances, an object of the present invention is to provide an automated transaction device, a monitoring device, and an automated transaction system including the automated transaction device and the monitoring device, that are capable of creating an environment required in order to swiftly ascertain the circumstances and implement a swift and appropriate response when an abnormal banknote has been inserted into an automated transaction device.

Solution to Problem

An automated transaction device according to the present invention includes a medium insertion port that accepts insertion of a medium from a customer, a determination section that determines whether or not the inserted medium is abnormal, and a notification section that notifies a specific notification target selected from plural notification targets when the determination section has determined the inserted medium to be a counterfeit note.

A monitoring device according to the present invention is configured by a device connected so as to be capable of communicating with an automated transaction device that includes a medium insertion port that accepts insertion of a medium from a customer and a determination section that determines whether or not the inserted medium is abnormal, and that transmits a determination result when the determination section has determined the inserted medium to be abnormal. The monitoring device includes a reception section that receives the determination result, and a notification section that transmits information received by the reception section. The notification section notifies a specific notification target selected from plural notification targets.

An automated transaction system according to the present invention performs various transactions in response to customer operation. The automated transaction system includes an automated transaction device, a monitoring device, and a reception section. The automated transaction device includes a medium insertion port that accepts insertion of a medium from a customer, and a determination section that determines whether or not the inserted medium is abnormal. The automated transaction device transmits a determination result when the determination section has determined the inserted medium to be abnormal. The monitoring device is configured by a device connected so as to be capable of communicating with the automated transaction device. The monitoring device includes a reception section that receives the determination result, and a notification section that transmits information received by the reception section. The notification section notifies a specific notification target selected from plural notification targets.

BRIEF DESCRIPTION OF DRAWINGS

FIG. 3A is a table illustrating an example of notification target information according to the present invention.

FIG. 3B is a table illustrating an example of supplementary information according to the present invention.

FIG. 4A is a flowchart illustrating transaction processing executed by the automated transaction device according to the first exemplary embodiment.

DESCRIPTION OF EMBODIMENTS

Figure 1:
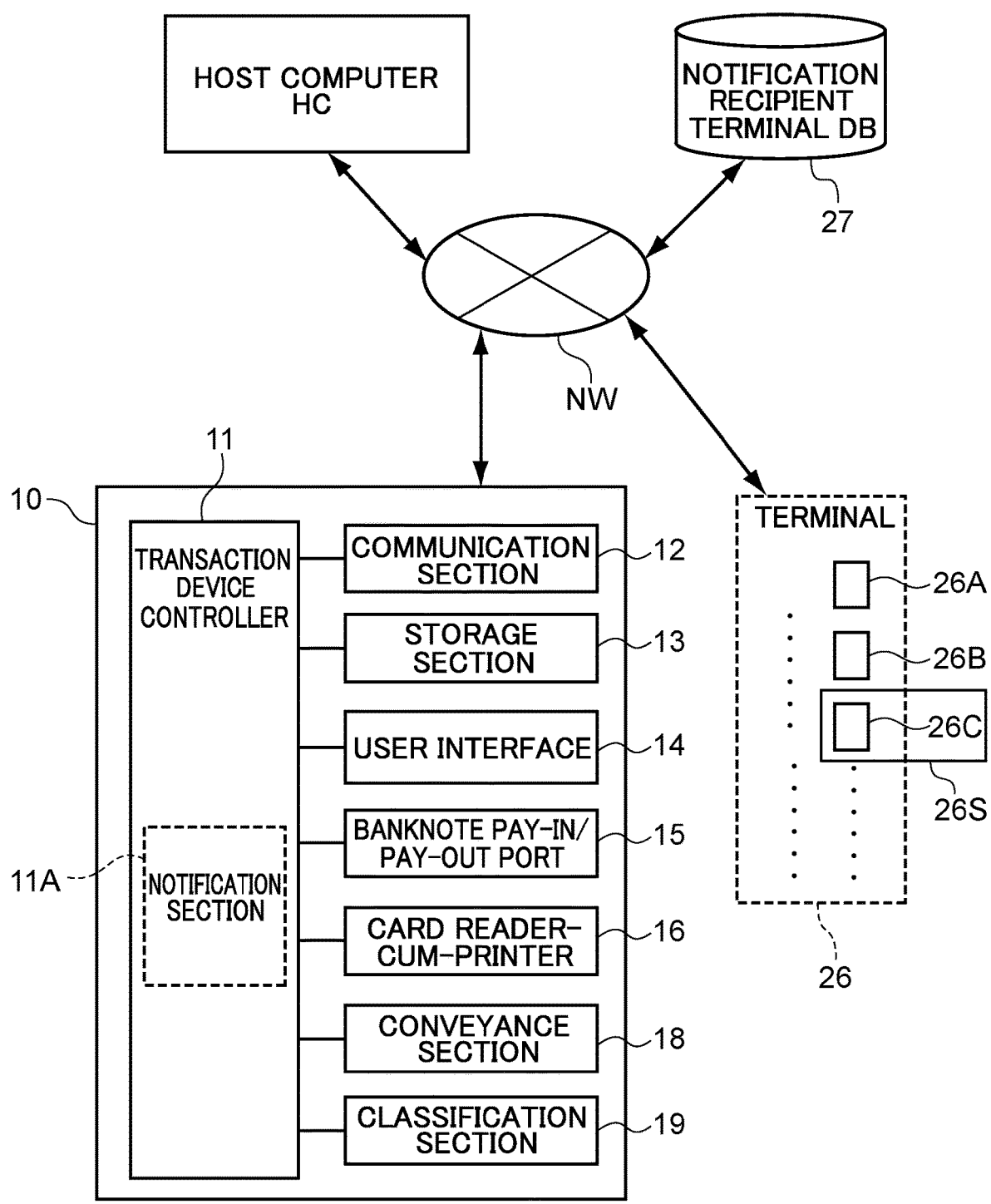
FIG. 1 is a block diagram illustrating configuration of an automated transaction device according to a first exemplary embodiment.

Detailed explanation follows regarding exemplary embodiments of the present invention. In the following explanation and in the accompanying drawings, portions that are substantially the same as or equivalent to each other are allocated the same reference numerals.

In the following exemplary embodiment, explanation is given regarding a case in which an automated transaction device according to the present invention is an ATM. Moreover, in the following exemplary embodiment, explanation is given regarding a case in which banknotes configure the medium handled by the automated transaction device.

First Exemplary Embodiment

Figure 2:
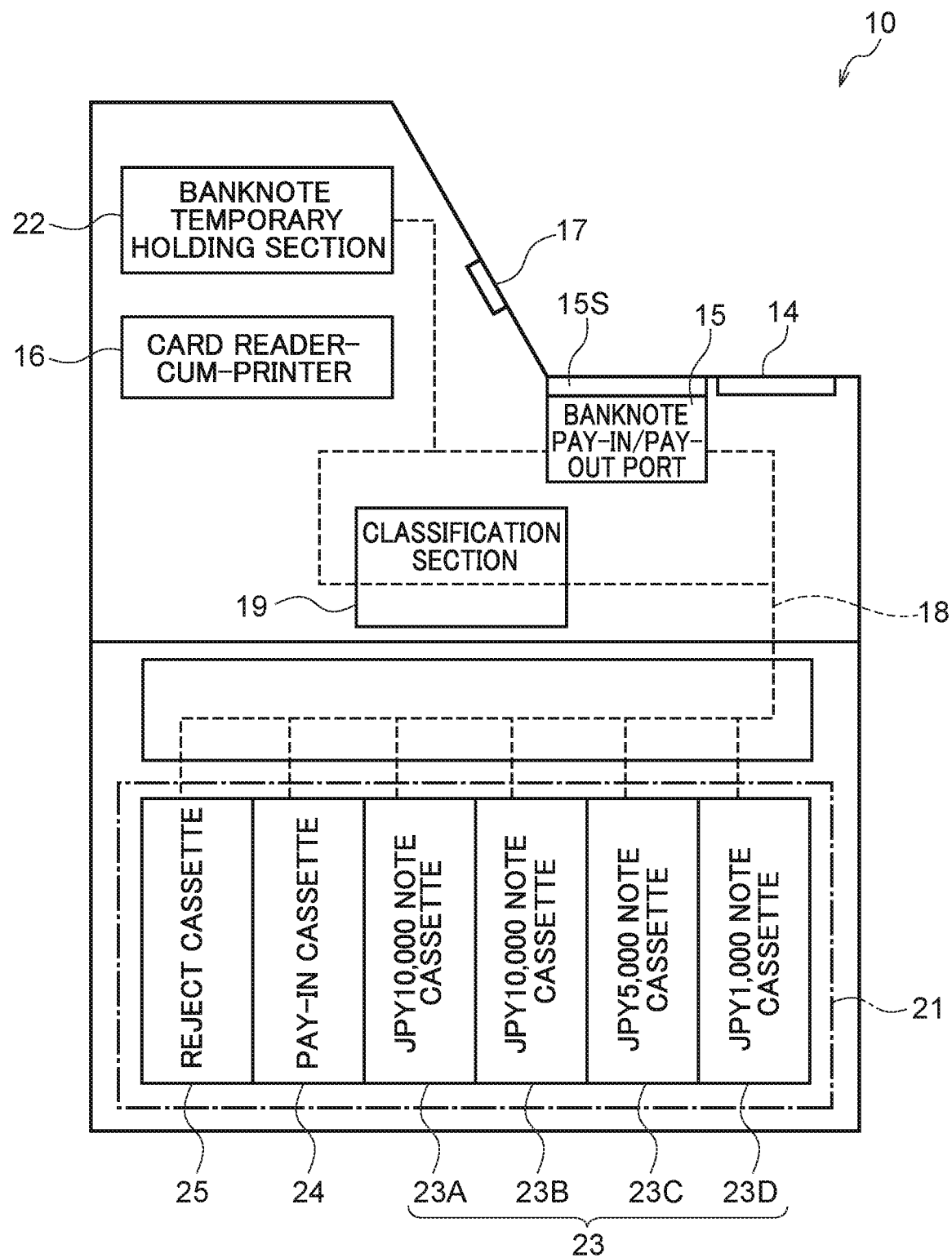
FIG. 2 is a diagram illustrating configuration of an automated transaction device according to the first exemplary embodiment.

FIG. 1 and FIG. 2 are block diagrams illustrating configuration of an ATM 10 according to the present exemplary embodiment. The ATM 10 will be explained with reference to FIG. 1 and FIG. 2. For example, ATMs 10 are installed in respective branches of a financial institution, and each ATM 10 is connected to a host computer HC of the financial institution via a network NW. The network NW is, for example, a communication line configured by a LAN or a public communication network (public network).

Although the drawings illustrate a single ATM 10, plural ATMs 10 may be deployed. Each ATM 10 may possess a unique ID.

Operation of the ATM 10 is controlled by a transaction device controller 11. The transaction device controller 11 includes a notification section 11A that performs notification when a banknote inserted into the ATM 10 has been determined to be abnormal, namely, when the ATM 10 has received an abnormal banknote.

A communication section 12 is configured by a Network Interface Card (NIC) or the like that exchanges data with the exterior according to instructions from the transaction device controller 11. For example, the communication section 12 communicates with external devices such as the host computer HC as the need arises during transaction control by the ATM 10. The host computer HC includes a database (not illustrated in the drawings) stored with customer information and the like, and the ATM 10 accesses the database to perform transaction processing with a customer (a user operating the ATM 10).

A storage section 13 is a storage device configured by a hard disk, flash memory, a Solid State Drive (SSD), Random Access Memory (RAM), or the like, and stores software required by the transaction device controller 11 for processing, data arising during processing, and the like as appropriate. In cases in which the ATM 10 holds a unique ID, this ID may be stored in the storage section 13.

A user interface 14 (hereafter "UI") is, for example, configured by a touch panel display, and receives operation from a user and displays operation input guidance, transaction details, and the like for the user. As illustrated in FIG. 2, the UI 14 is provided in a front face of the ATM 10.

A banknote pay-in/pay-out port 15, serving as a banknote insertion port, is an insertion port through which banknotes are paid in (inserted) when using the ATM 10 to make a deposit. The banknote pay-in/pay-out port 15 also serves as a dispensing port through which banknotes are paid out (dispensed) when using the ATM 10 to make a withdrawal. As illustrated in FIG. 2, the banknote pay-in/pay-out port 15 is provided with a movable shutter 15S that is capable of moving so as to open and close an opening of the banknote pay-in/pay-out port 15.

A card reader-cum-printer 16 reads customer information held on a transaction card when a card belonging to a user has been inserted into a card insertion/removal port 17, serving as a card insertion port, provided in the front face of the ATM 10 illustrated in FIG. 2. The card reader-cum-printer 16 supplies customer data, this being data representing read customer information, to the transaction device controller 11.

When supplied with a card dispensing signal from the transaction device controller 11, the card reader-cum-printer 16 dispenses the transaction card from the interior through the card insertion/removal port 17. The card reader-cum-printer 16 is also capable of printing a transaction outcome conveyed in a transaction detail print signal on a receipt slip in response to a transaction detail print signal supplied from the transaction device controller 11.

A conveyance section 18 has a function of conveying banknotes between various sections of the ATM 10 using rollers and the like. As illustrated in FIG. 2, the conveyance section 18 forms conveyance paths that convey banknotes between the banknote pay-in/pay-out port 15 and respective sections inside the ATM 10. Namely, the conveyance section 18 is provided so as to be capable of conveying banknotes between sections present along the conveyance paths.

A classification section 19 is provided along a conveyance path of the conveyance section 18, and classifies banknotes as banknotes are conveyed through the classification section 19. For example, the classification section 19 is capable of classifying banknotes that have been inserted into the banknote pay-in/pay-out port 15 as genuine notes, counterfeit notes, or damaged notes. The transaction device controller 11 is capable of determining whether or not an inserted banknote is abnormal, for example whether or not an inserted banknote is a counterfeit note, based on classification results from the classification section 19.

A banknote storage section 21 is configured by a set of cassettes including plural cassettes in which banknotes are stored. Each cassette is provided so as to be capable of being attached and detached with respect to the ATM 10. The banknote storage section 21 includes denominational cassettes 23 that store banknotes to be dispensed from the ATM 10 by denomination. The denominational cassettes 23 include cassettes 23A to 21D. In FIG. 2, as an example, the cassettes 23A and 23B are cassettes for JPY10,000 notes, the cassette 23C is a cassette for JPY5,000 notes, and the cassette 23D is a cassette for JPY1,000 notes.

The banknote storage section 21 includes a pay-in cassette 24 that stores banknotes that have been inserted through the banknote pay-in/pay-out port 15. The banknote storage section 21 also includes a reject cassette 25 that stores abnormal banknotes when a banknote inserted through the banknote pay-in/pay-out port 15 has been classified as an abnormal banknote (such as a counterfeit note or a damaged note) by the classification section 19.

As illustrated in FIG. 2, a banknote temporary holding section 22 is provided on the conveyance path 18 of the ATM 10. The banknote temporary holding section 22 is a region in which conveyed banknotes in the ATM 10, for example banknotes that have been taken in through the banknote pay-in/pay-out port 15 or banknotes to be dispensed through the banknote pay-in/pay-out port 15, are temporarily stacked and retained. For example, the banknote temporary holding section 22 is capable of temporarily stacking and retaining banknotes that have been classified as abnormal banknotes by the classification section 19.

As illustrated in FIG. 1, plural terminals 26, each having a wired or wireless connection to the network NW, are capable of receiving various information transmitted from the communication section 12 of the ATM 10. Each terminal 26 is a terminal capable of becoming a recipient of notification to notify the fact that a banknote inserted through the banknote pay-in/pay-out port 15 of the ATM 10 has been classified as an abnormal banknote by the classification section.

The terminals 26 are, for example, fixed-location terminals such as personal computers (PCs) or service counter terminals installed at a service counter in a bank, mobile terminals such as smartphones, feature-phones, or pagers, or wearable devices in the form of watches or glasses. Each terminal 26 may be configured by a transceiver or the like. The terminals are, for example, used or carried by financial institution staff in branches of the financial institution, for example a bank. The terminals 26 may, for example, be terminals carried by security staff, or may be terminals used by operators in a customer service center that responds from a remote location away from a branch of the financial institution, for example a bank, in which the ATM 10 is installed.

A notification recipient terminal database (hereafter "notification recipient terminal DB") 27 is a database connected to the communication section 12 of each ATM 10 via the network NW. The notification recipient terminal DB 27 stores notification recipient terminal information (notification target information), this being information relating to the terminals 26.

The notification recipient terminal information includes, for example, terminal identification information (ID), address information, this being information regarding addresses set for the terminals, user information, this being information relating to the current user of each terminal, and status information regarding the operational status of each terminal. The address information may, for example, include an email address or telephone number set for each terminal 26.

The user information may include the names of users, numbers, such as employee numbers, of users, the departments to which users belong, the professional duties of users, and identification numbers (IDs) of ATMs 10 for which each user is responsible. The status information may, for example, include information regarding the current location of each terminal 26, information regarding the power source status of each terminal 26, and information regarding the current operational status of each terminal 26. The notification recipient terminal information may be capable of being updated either manually or automatically (for example, at regular time intervals).

FIG. 3A is a table illustrating an example of the notification recipient terminal information stored in the notification recipient terminal DB 27. FIG. 3A illustrates an example in which a terminal 26A, a terminal 26B, a terminal 26C, and so on, these being respective terminals configuring the plural terminals 26, are each stored against notification recipient terminal information including: a terminal ID as terminal identification information; an email address as address information; user information including the name of the terminal user, identification numbers of ATMs 10 for which the user is responsible, and the professional duties of the user; and status information including a power source status (power ON/power OFF) of the terminal and a distance between the ATM 10 and the terminal (in meters).

The notification section 11A notifies a specific terminal 26 of the fact that a banknote inserted through the banknote pay-in/pay-out port 15 has been determined to be an abnormal banknote, for example a counterfeit note, by the classification section 19. More specifically, at least one of the individual terminals 26 included among the terminals 26 is specified, and this specific notification recipient terminal is notified. In the drawings, as an example, out of the plural terminals 26 (terminal 26A, terminal 26B, terminal 26C, and so on), the terminal 26C is selected as a terminal 26S, configuring a selected notification recipient terminal.

The notification recipient terminal 26S is selected based on the notification recipient terminal information stored in the notification recipient terminal information DB 27. For example, when a banknote inserted into an ATM 10 has been determined to be an abnormal banknote, the notification section 11A may select, namely specify, the notification recipient terminal 26S simply based on the distances between the ATM 10 in question and the respective terminals 26, or based on the IDs of the ATMs 10 for which the users using the respective terminals 26 are responsible.

Specifically, the terminal 26 that is the shortest distance (at the location closest to) the ATM 10 may be specified as the notification recipient terminal 26S, or a terminal 26 used by the person responsible for the ATM 10 may be selected, namely specified, as the notification recipient terminal 26S.

In special circumstances, for example when an inserted banknote is a counterfeit note, the specific notification recipient terminal 26S may be decided based on the department or professional duties of a terminal 26 user. For example, when an inserted banknote is a counterfeit note, a terminal 26 used by a person belonging to a department with responsibility for dealing with counterfeit notes, or a person whose professional duties involve dealing with counterfeit notes, may be selected, namely specified, as the notification recipient terminal 26S.

Selection of the notification recipient terminal 26S may also be performed based on other information, in addition to the notification recipient terminal information. Examples of such other information include supplementary information relating to the circumstances at the time a banknote determined to be an abnormal banknote such as a counterfeit note was received. More specific examples thereof include abnormal note information, serving as abnormal medium information, described below, customer information, and identification information of the ATM 10.

Abnormal note information is information relating to abnormal banknotes, including for example, the type of banknote that has been determined to be abnormal, the number of such banknotes, a transaction value (the total number of banknotes inserted in the transaction that was being performed when the determination was made), and the time of determination (time of insertion). Abnormal note information may also include the serial numbers of banknotes inserted into the ATM 10. Such serial numbers may, for example, be read by the classification section 19 and stored in the storage section 13.

Customer information is information relating to the customer who inserted a banknote determined to be an abnormal banknote such as a counterfeit note. For example, the customer information includes a customer name, account number, transaction type, transaction time, transaction value, transaction history, and the like. Customer information may, for example, be read by the card reader-cumprinter 16 and stored in the storage section 13. Customer information may also, for example, be read from the host computer HC and stored in the storage section 13.

The identification information is, for example, information specifying the individual ATM 10 that has received a banknote determined to be abnormal. The identification information may, for example, include a device number (ID), installation location, branch number, and the like. For example, the device ID mentioned above may be stored in the storage section 13 as an identification number of the ATM 10.

For example, in addition to the professional duties of the users of the terminals 26 included in the notification recipient terminal information, the notification section 11A may also select the notification recipient terminal 26S based on the transaction value when the abnormality was determined, as included in the abnormal note information. For example, in cases in which a counterfeit note is inserted during a high value transaction, a terminal 26 used by a person responsible for high value transactions may be set as the notification recipient terminal 26S.

Moreover, for example, the notification section 11A may able to apply a set of priorities when selecting the notification recipient terminal 26S. Such a set of priorities may be based on the notification recipient terminal information, or may be based on both the notification recipient terminal information and the supplementary information.

Specifically, for example, the notification section 11A may be capable of applying a set of priorities according to the distances between the ATM 10 that has received an abnormal banknote and the respective terminals 26. For example, the notification section 11A may prioritize such that terminals 26 are prioritized progressively higher the closer they are to the ATM 10, and select a predetermined number of notification target terminals 26S in sequence starting from the highest priority terminal 26.

The notification section 11A is also capable of presenting other information in addition to the fact that a banknote inserted through the banknote pay-in/pay-out port 15 has been determined to be abnormal. The notification section 11A is capable of presenting the specific notification recipient terminal 26S with notification content information including the fact that a banknote has been determined to be abnormal, and also including other information.

The notification content information when a banknote inserted into the ATM 10 has been determined to be abnormal may include supplementary information, this being information relating to the circumstances at the time the abnormal banknote was received, such as the abnormal note information, customer information, and identification information described above. FIG. 3B illustrates an example of information included as abnormal note information, customer information, and identification information in such supplementary information.

The notification section 11A is capable of performing notification using various methods. For example, the notification section 11A performs notification by transmitting data to the specific notification recipient terminal 26S in a predetermined format via the communication section 12. Notification is, for example, performed by transmitting text information by email, or as a text message using a Short Message Service (SMS). Notification may also be performed by an alarm tone, vibration, or the like. The notification section 11A may also perform notification by making a telephone call to the terminal.

In this manner, when a banknote inserted into the ATM 10 has been determined to be abnormal, the notification section 11A selects a specific notification recipient terminal 26S from the plural terminals 26 based on the notification recipient terminal information stored in the notification recipient terminal DB 27, and notifies the specific predetermined notification recipient terminal 26S. Moreover, in addition to using the notification recipient terminal information, the notification section 11A may select the terminal 26S based on supplementary information relating to the circumstances at the time the abnormal banknote was received. Moreover the notification section 11A may present the supplementary information to the terminal 26S in addition to the fact that the presence of an abnormality has been determined.

Note that in the present exemplary embodiment, explanation has been given regarding an example in which the notification recipient terminal DB 27 is connected to the network NW. However, the notification recipient terminal DB 27 may be provided in a server external to the ATMs 10, in the host computer HC, or within the ATMs 10. It is sufficient that the notification recipient terminal DB 27 be connected so as to enable the notification section 11A to acquire information from the notification recipient terminal DB 27.

Transaction Control Routine

Figure 4B:
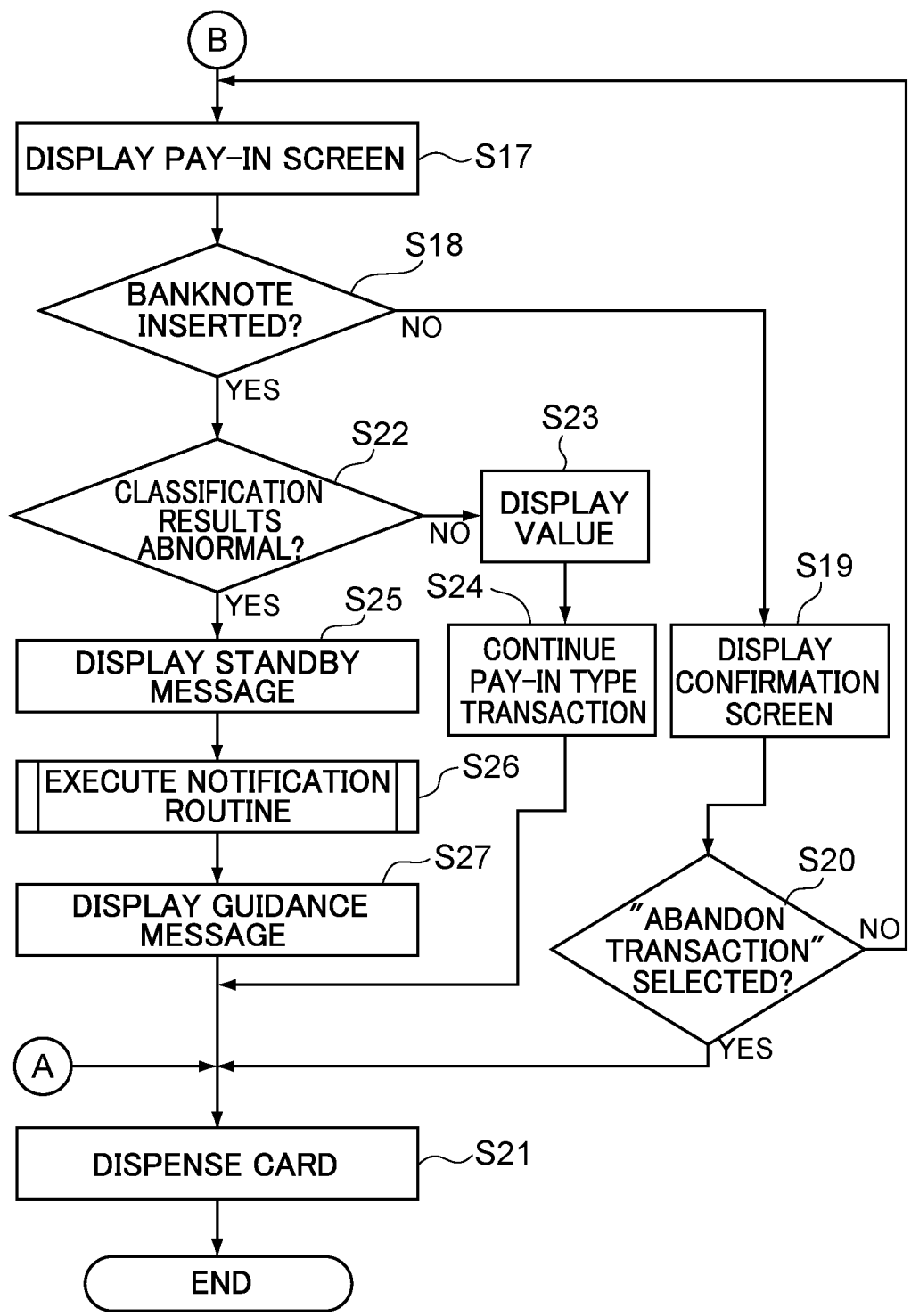
FIG. 4B is a flowchart illustrating transaction processing executed by the automated transaction device according to the first exemplary embodiment.

FIG. 4A and FIG. 4B illustrate a transaction control routine executed by the ATM 10 that configures an automated transaction device according to the first exemplary embodiment.

When input with a power source, for example, the transaction device controller 11 executes the transaction control routine illustrated in FIG. 4A and FIG. 4B. Note that the ATM 10 may be provided with a motion sensor or the like such that the transaction control routine is executed when a user has been detected approaching the ATM 10.

As illustrated in FIG. 4A, first, the transaction device controller 11 displays a transaction type input reception display on the UI 14 (step S11). The transaction type input reception display is a display to prompt a customer (user) to input a selection for a desired transaction, in which plural transaction categories are displayed on a screen of the UI 14. For example, pay-out type transaction buttons such as "Withdrawal" and pay-in type transaction buttons such as "Deposit" and "Wire transfer" are displayed.

After executing step S11, the transaction device controller 11 determines whether or not a pay-in type transaction has been selected as the transaction type input by the user using the UI 14 (step S12). If the transaction device controller 11 determines that a pay-in type transaction has not been selected at step S12 (step S12: NO), a non-pay-in type transaction is executed (step S13).

If the transaction device controller 11 determines that a pay-in type transaction has been selected at step S12 (step S12: YES), the transaction device controller 11 determines whether or not a card has been inserted into the card insertion/removal port 17 (step S14). If the transaction device controller 11 determines that a card has not been taken in at step S14 (step S14: NO), determination as to whether or not a card has been taken in is repeated after a fixed duration. This determination may, for example, be performed by providing a card detection sensor in the vicinity of the card insertion/removal port 17, and determining whether or not this sensor has detected a card.

If the transaction device controller 11 determines that a card has been taken in at step S14 (step S14: YES), the card is taken into the card reader-cum-printer 16, and based on the customer information read by the card reader-cum-printer 16, the UI 14 displays a screen prompting input of pay-in conditions. After input of the pay-in conditions has been received, a screen prompting PIN input is displayed (step S15).

After executing step S15, the transaction device controller 11 determines whether or not the pay-in conditions and PIN have been input (step S16). If the transaction device controller 11 determines that the pay-in conditions and PIN have not been input at step S16 (step S16: NO), the transaction device controller 11 repeats step S15 and stands by for a fixed duration for input of the pay-in conditions and PIN, after which the transaction device controller 11 repeats the determination as to whether or not the pay-in conditions and PIN have been input (step S16).

If the transaction device controller 11 determines that the pay-in conditions and PIN have been input at step S16 (step S16: YES), at step S17 illustrated in FIG. 4B, a screen prompting the user to insert money is displayed on the UI 14. For example, at step S17, a written message prompting the user to insert banknotes into the banknote pay-in/pay-out port 15 is displayed on a pay-in screen.

After executing step S17, the transaction device controller 11 determines whether or not banknotes have been inserted into the banknote pay-in/pay-out port 15 by the user (step S18). Whether or not banknotes have been inserted into the banknote pay-in/pay-out port 15 may be determined based on detection signals from a sensor provided in the banknote pay-in/pay-out port 15.

If the transaction device controller 11 determines that banknotes have not been inserted into the banknote pay-in/pay-out port 15 at step S18 (step S18: NO), a confirmation screen is displayed to prompt the user to select whether to abandon the transaction or continue with the transaction (step S19). After executing step S19, the transaction device controller 11 determines whether or not the user has selected to abandon the transaction (step S20).

If the transaction device controller 11 determines that the user has not selected to abandon the transaction at step S20 (step S20: NO), the transaction device controller 11 repeats step S17 and displays a screen on the UI 14 again in order to prompt the user to insert money.

If the transaction device controller 11 determines that the user has selected to abandon the transaction at step S20 (step S20: YES), the card reader-cum-printer 16 is operated such that the card is dispensed through the card insertion/removal port 17 (step S21), and the transaction is ended.

If the transaction device controller 11 determines that banknotes have been inserted into the banknote pay-in/pay-out port 15 at step S18 (step S18: YES), the transaction device controller 11 determines whether or not classification results of the classification section 19 regarding the inserted banknotes are abnormal (step S22). At step S22, the transaction device controller 11 causes the conveyance section 18 to convey banknotes between the respective sections, including the banknote pay-in/pay-out port 15 and the classification section 19, and causes the classification section 19 to perform classification.

If the transaction device controller 11 determines that the classification results of the classification section 19 are not abnormal at step S22, namely that all of the inserted banknotes are genuine notes (step S22: NO), the transaction device controller 11 displays the value of the inserted banknotes on the UI 14 (step S23), and continues with the pay-in type transaction (step S24). After executing step S24, the transaction device controller 11 operates the card reader-cum-printer 16 to dispense the card through the card insertion/removal port 17 (step S21), and the transaction is ended.

Figure 6:
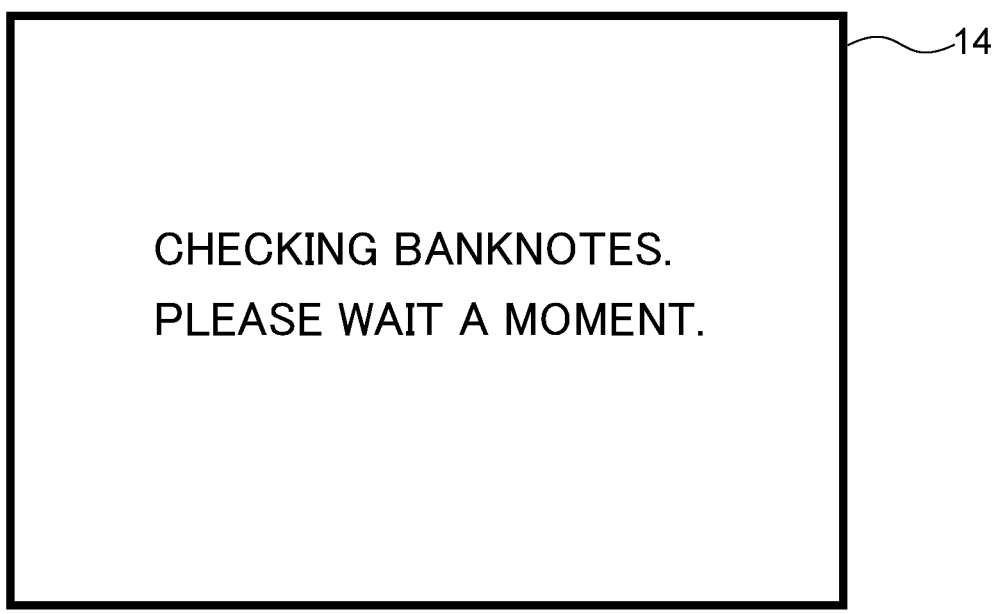
FIG. 6 is a diagram illustrating an example of display of a standby screen according to the first exemplary embodiment.

If the transaction device controller 11 determines the classification results from the classification section 19 to be abnormal at step S22 (step S22: YES), at step S25, a standby message is displayed on the UI 14. At step S25, the UI 14 displays a message interrupting the transaction and requesting the customer to wait. For example, display such as that illustrated in FIG. 6 is performed. For example, the transaction device controller 11 may determine the classification results from the classification section 19 to be abnormal in cases in which damaged notes or counterfeit notes are mixed in with other inserted banknotes.

After executing step S25, the transaction device controller 11 executes a notification routine using the notification section 11A (step S26).

Figure 7:
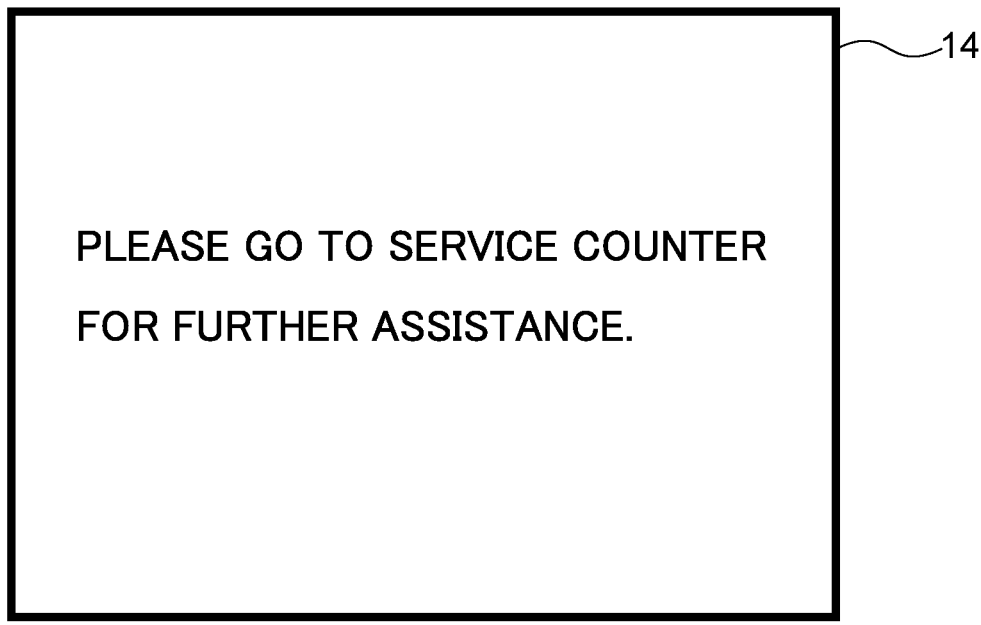
FIG. 7 is a diagram illustrating an example of display of a guidance screen according to the first exemplary embodiment.

After executing step S26, namely after completing the notification routine, the transaction device controller 11 displays a guidance message on the UI 14 (step S27). The guidance message may, for example, be a written message displayed so as to prompt the customer to seek assistance from a bank employee at a bank service counter. For example, display such as that illustrated in FIG. 7 may be performed.

After executing step S27, the transaction device controller 11 operates the card reader-cum-printer 16 to dispense the card through the card insertion/removal port 17, and the transaction control routine is ended.

Notification Routine

Figure 5:
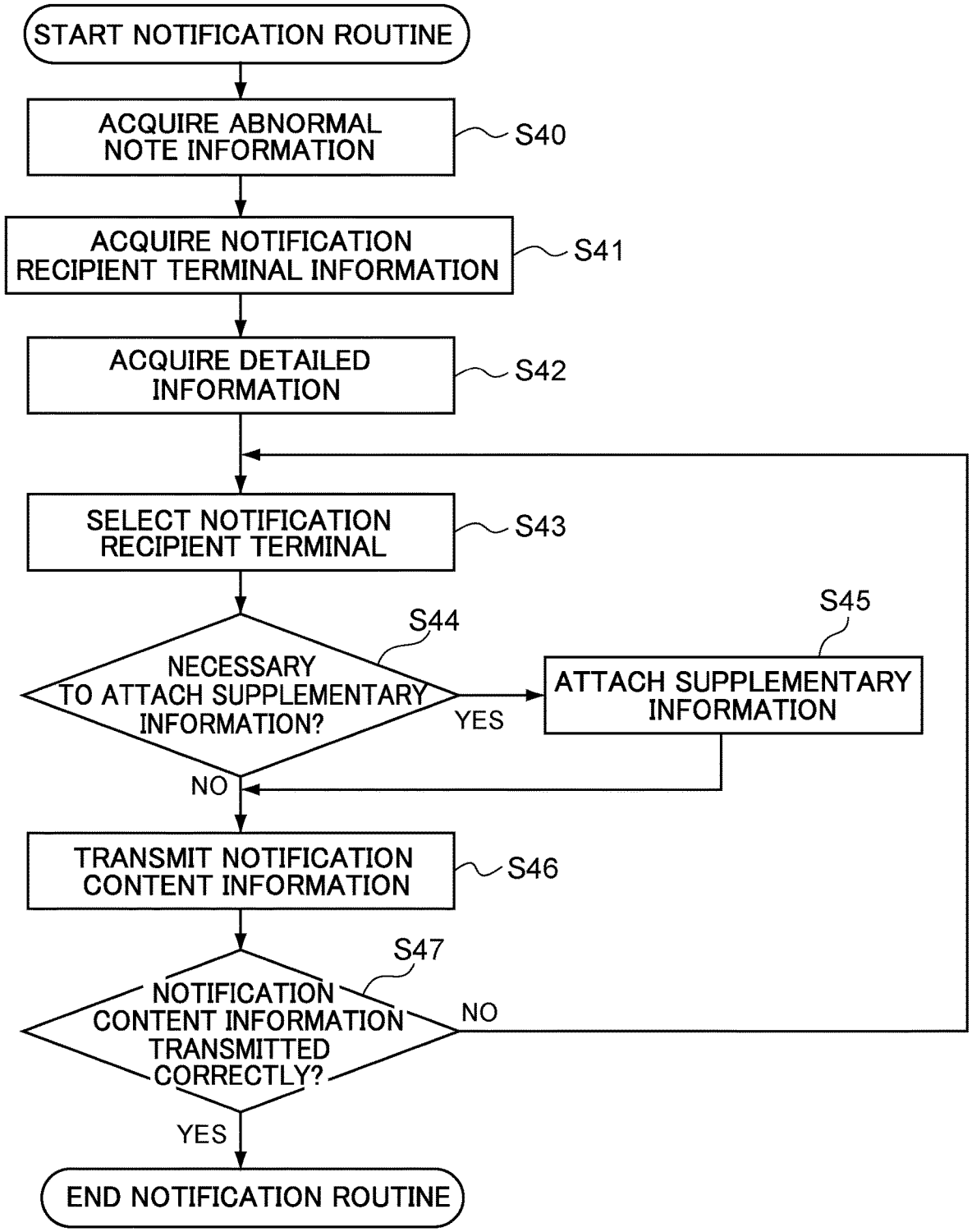
FIG. 5 is a flowchart illustrating a notification routine executed by the automated transaction device according to the first exemplary embodiment.

FIG. 5 illustrates the notification routine executed at step S26 in FIG. 4B.

When the notification section 11A has determined a banknote inserted into the banknote pay-in/pay-out port 15 to be abnormal at step S22, and has displayed the standby message at step S25, the notification section 11A begins the notification routine at step S26. Note that step S26 may be started when a banknote has been determined to be abnormal at step S22, so as to be performed in parallel with the display of the standby message at step S25.

First, the notification section 11A acquires abnormal note information, this being information relating to the abnormal banknote that has been inserted into the ATM 10 in a transaction (step S40). For example, the abnormal note information includes the type of the abnormal note, the number of abnormal notes, the transaction value, the insertion time, and the like. Moreover, for example, the abnormal note information may include information relating to the classification results from the classification section 19, and may include information indicating whether the abnormal note is a damaged note or a counterfeit note.

Next, the notification section 11A acquires the notification recipient terminal information from the notification recipient terminal DB 27 (step S41). The notification recipient terminal information is information relating to the terminals 26, and, for example, includes terminal 26 address information, terminal 26 user information, terminal 26 status information, and the like.

After the notification section 11A has executed step S41, the notification section 11A acquires detailed information, this being detailed information relating to the banknote that has been determined to be an abnormal banknote (step S42). The detailed information includes, for example, customer information such as the account number, the transaction type, the transaction value, and transaction history of the customer involved in the transaction in which the abnormal banknote was received.

For example, the detailed information acquired at step S42 may be acquired from customer data read by the card reader-cum-printer 16, or from customer data stored by the host computer HC.

After executing step S42, the notification section 11A selects the notification recipient terminal 26S (step S43). At step S43, the notification section 11A selects the notification recipient terminal 26S based on notification recipient terminal information such as that described above, as acquired at step S41. For example, the terminal 26 the shortest distance from (at the location closest to) the ATM 10 may be set as the notification recipient terminal 26S, or a terminal 26 used by the person responsible for the ATM 10 in question may be selected, namely specified, as the notification recipient terminal 26S.

Selection of the specific notification recipient terminal 26S at step S43 may also be performed based on other information in addition to the notification recipient terminal information. For example, such other information may be the abnormal note information acquired at step S40, the detailed information acquired at step S42, identification information such as the identification number of the ATM 10 that received the abnormal banknote, or the like. Namely, such other information may be supplementary information relating to the circumstances at the time the abnormal banknote was received.

Accordingly, for example, in addition to the professional duties of the users of the terminals 26 included in the notification recipient terminal information, the notification section 11A may also select the notification recipient terminal 26S based on the transaction value when the abnormal banknote was inserted, as included in the abnormal note information. For example, in cases in which the abnormal banknote is a counterfeit note, or in cases in which a counterfeit note is inserted during a high value transaction, a terminal 26 used by a person responsible for high value transactions may be set as the notification recipient terminal 26S.

Moreover, for example, in addition to the professional duties of the users of the terminals 26 included in the notification recipient terminal information, the notification section 11A may also select the notification recipient terminal 26S based on the classification result of the abnormal banknote as included in the abnormal note information. For example, in cases in which the abnormal banknote is a damaged note, a terminal 26 used by a person responsible for dealing with damaged notes may be selected, and in cases in which the abnormal banknote is a counterfeit note, a terminal 26 used by a person responsible for dealing with counterfeit notes may be selected as the notification recipient terminal 26S.

After executing step S43, the notification section 11A determines whether or not it is necessary to attach supplementary information (step S44) when the notification section 11A notifies the specific notification recipient terminal 26 of the fact that an abnormal banknote has been received. At step S44, for example, the notification section 11A may determine whether or not it is necessary to attach supplementary information based on information used in the selection at step S43. For example, supplementary information may be determined to be necessary in cases in which the customer is performing a high value transaction.

If the notification section 11A determines that it is necessary to attach supplementary information at step S44 (step S44: YES), supplementary information is attached as the notification content information configuring the content that is presented to the notification recipient terminal, in addition to the fact that an abnormal banknote has been received (step S45).

After executing step S45, the notification section 11A transmits the notification content information to the specific notification recipient terminal 26S selected at S43.

Figure 8:
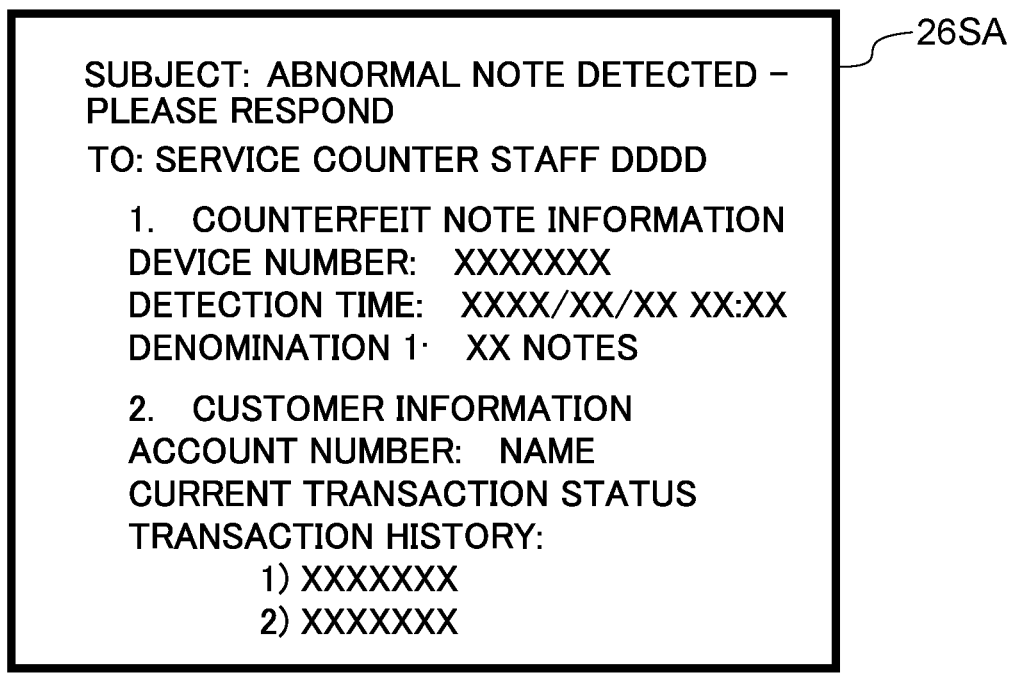
FIG. 8 is a diagram illustrating an example of information presented to a notification recipient terminal according to the first exemplary embodiment.

For example, in cases in which notification is performed by email, the notification section 11A sends an email including the supplementary information in addition to the fact that an abnormal banknote has been received. For example, in cases in which a counterfeit note has been received, the email text 26SA illustrated in FIG. 8 may be displayed on a display screen of the notification recipient terminal 26S. Note that the notification content information may also be transmitted as a text message or the like. The notification section 11A may also perform notification by making a telephone call to the terminal.

If the notification section 11A determines that it is not necessary to attach supplementary information at step S45 (step S44: NO), the fact that an abnormal banknote has been received is transmitted as notification content information without attaching supplementary information. For example, in cases in which notification is performed by email, the notification section 11A sends an email including the fact that a damaged note has been received.

After executing step S46, the notification section 11A determines whether or not the notification content information has been transmitted correctly (step S47). For example, at step S47, the notification section 11A may determine whether or not the notification content information has been transmitted correctly based on a response from the specific notification recipient terminal 26S. For example, in cases in which notification is performed by email, it may be determined that the notification content information was not transmitted correctly if an email response saying the address does not exist is returned from the mail server.

If the notification section 11A determines that the notification content information has not been transmitted correctly at step S47 (step S47: NO), the notification section 11A repeats step S43, and repeats selection of a specific notification recipient terminal 26S. When step S44 is executed after step S47 has been executed, for example, the terminal 26 to which the notification content information was not transmitted correctly may be excluded when repeating the selection of the specific notification recipient terminal 26S.

If the notification section 11A determines that the notification content information was transmitted correctly at step S47 (step S47: YES), the notification routine is ended.

As described above, in the ATM 10 of the present exemplary embodiment, when a banknote inserted into the ATM 10 is determined to be abnormal, a specific notification recipient terminal is selected from out of plural notification recipient terminals based on the notification recipient terminal information stored in the notification recipient terminal DB, enabling the specific notification recipient terminal to be notified. The specific notification recipient terminal can be selected based on supplementary information including, for example, abnormal note information, customer information, and identification information of the ATM 10 in addition to the notification recipient terminal information. Moreover, the notification content information presented to the notification recipient terminal may include supplementary information.

Accordingly, when a banknote inserted into the ATM 10 is determined to be abnormal, the ATM 10 is capable of selecting the most appropriate notification recipient terminal according to the circumstances when the abnormal banknote was received. Moreover, by presenting the supplementary information, the user of the notification recipient terminal can be swiftly provided with detailed information relating to these circumstances. This thereby enables an automated transaction device to be provided that creates an environment to swiftly ascertain the circumstances and implement a swift and appropriate response when an abnormal banknote has been received by the automated transaction device.

Second Exemplary Embodiment

Figure 9:
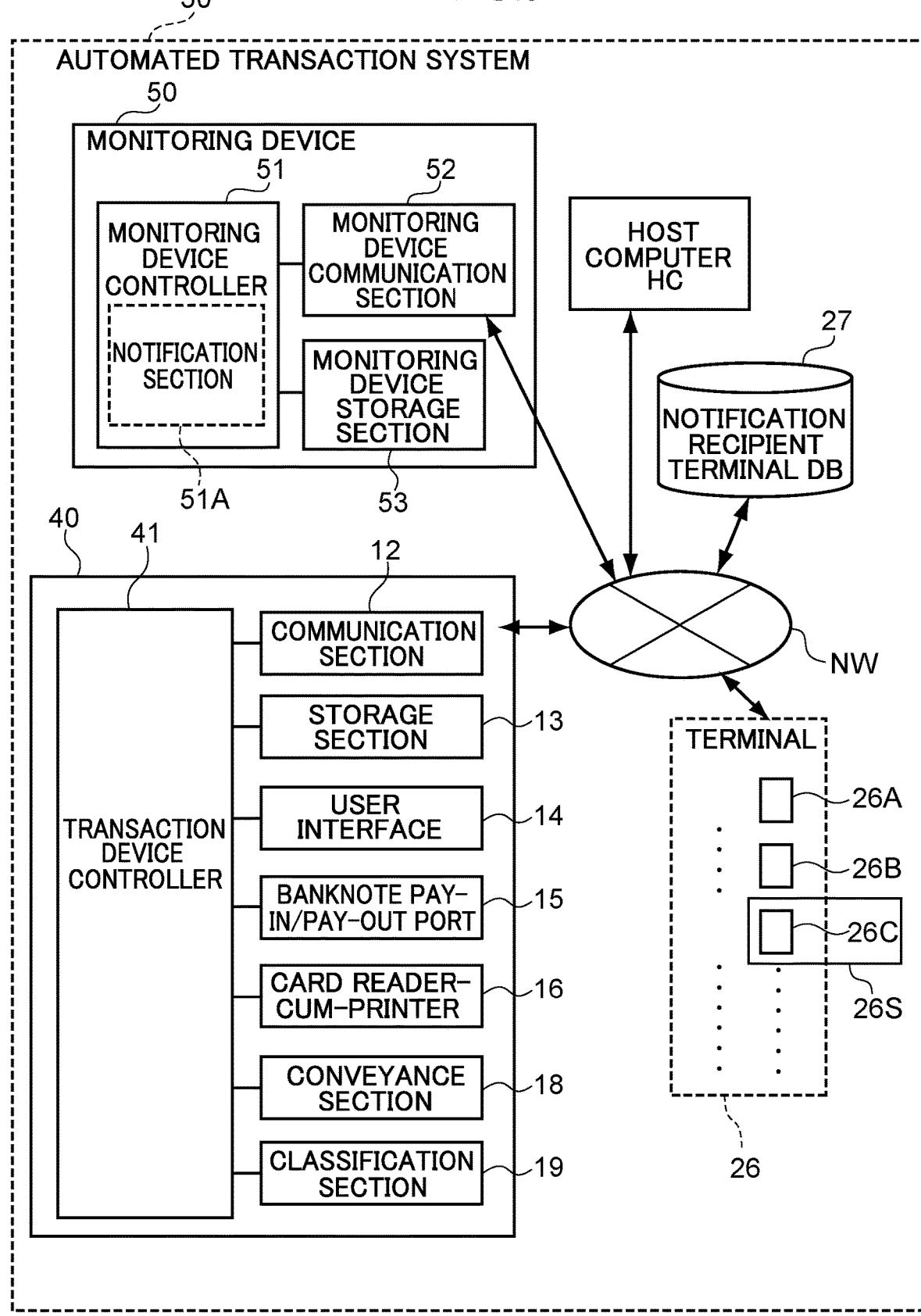
FIG. 9 is a block diagram illustrating configuration of an automated transaction system according to a second exemplary embodiment.

FIG. 9 is a block diagram illustrating configuration of an automated transaction system 30 according to a second exemplary embodiment. The automated transaction system 30 includes ATMs 40 and a monitoring device 50. The ATMs 40, the monitoring device 50, a notification recipient DB 25, and a host computer HC are connected to each other through a network NW. The network NW is, for example, a communication line configured by a LAN or a public communication network (public network).

The ATMs 40 differ from the ATMs 10 of the first exemplary embodiment in that they do not include the notification section 11A, but are otherwise configured similarly. In each ATM 40, when a transaction device controller 41 determines a banknote inserted through the banknote pay-in/pay-out port 15 to be an abnormal banknote, the transaction device controller 41 transmits the fact that such determination has been made to the monitoring device 50.

Together with the fact that this determination of an abnormal banknote has been made, the transaction device controller 41 may also transmit classification results of the classification section 19 and abnormal note information relating to the banknote that has been determined to be abnormal, such as the banknote type, the number of abnormal banknotes, the transaction value (total number of banknotes inserted in the transaction), the insertion time, and the like.

Operation of the monitoring device 50 is controlled by a monitoring device controller 51. The monitoring device controller 51 causes a notification section 51A to perform notification when the fact that a banknote inserted into an ATM 40 has been determined to be abnormal, or abnormal note information, has been received from the ATM 40 in question.

A monitoring device communication section 52 is configured by a Network Interface Card (NIC) or the like that exchanges data with the exterior according to instructions from the monitoring device controller 51. For example, the communication section 52 communicates with external devices such as the host computer HC as the need arises during transaction control by the ATMs 40. The host computer HC includes a database (not illustrated in the drawings) stored with customer information and the like, and the ATMs 40 access the database to perform transaction processing with a customer (a user operating the ATM 40).

When a banknote inserted into an ATM 40 has been determined to be abnormal, the monitoring device communication section 52 serves as a reception section that receives the information transmitted from the ATM 40 that a banknote has been determined to be abnormal. The communication section 52 also follows instructions from the monitoring device controller 51 to transmit information to be presented in notification.

A monitoring device storage section 53 is a storage device configured by a hard disk, flash memory, a Solid State Drive (SSD), Random Access Memory (RAM), or the like, and stores software required by the monitoring device controller 51 for processing, data arising during processing, and the like as appropriate.

The notification section 51A selects a specific notification recipient terminal 26S from the terminals 26, and notifies the notification recipient terminal 26S.

Automated Transaction System Notification Routine

Figure 10:
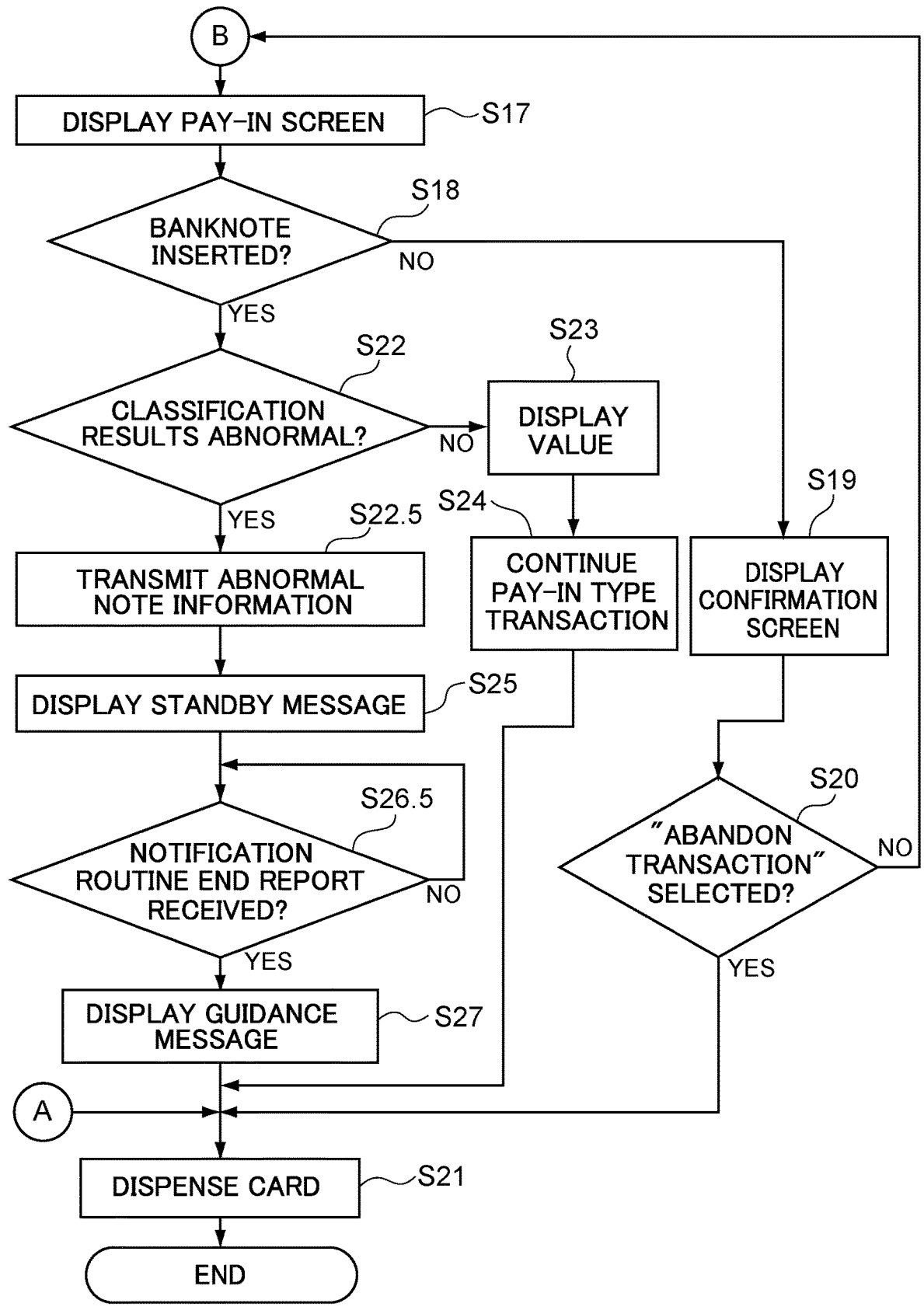
FIG. 10 is a flowchart illustrating transaction processing executed by an automated transaction system according to the second exemplary embodiment.

FIG. 10 illustrates portions of a transaction control routine of the present exemplary embodiment that differ from the transaction control routine of the first exemplary embodiment. Steps S11 to S24 are similar to those in the transaction control routine of the first exemplary embodiment, illustrated in FIG. 4A and FIG. 4B.

As illustrated in FIG. 10, if the transaction device controller 41 determines that the classification results of the classification section 19 are abnormal at step S22 (step S22: YES), the transaction device controller 41 transmits the fact that an abnormal banknote has been received to the monitoring device 50. For example, the transaction device controller 11 may determine the classification results from the classification section 19 to be abnormal in cases in which damaged notes or counterfeit notes are mixed in with other inserted banknotes.

Together with the fact that an abnormal banknote has been determined to be present, the transaction device controller 41 may also transmit abnormal note information, including classification results regarding whether the abnormal banknote is a damaged note or a counterfeit note, the type of the abnormal note, the number of abnormal banknotes, the transaction value, the insertion time, and the like to the monitoring device 50. In the present exemplary embodiment, explanation is given regarding an example in which the transaction device controller 41 transmits abnormal note information (step S22.5).

After executing step S22.5, the transaction device controller 41 displays a standby message on the UI 14 (step S25). At step S25, the UI 14 displays a message interrupting the transaction and requesting the customer to wait. For example, at step S25, display such as that illustrated in FIG. 6 is displayed on the UI 14. Note that step S25 may be started when a banknote has been determined to be abnormal at step S22, so as to be performed in parallel with the transmission of the abnormal note information at step S22.5.

After executing step S25, the transaction device controller 41 determines whether or not a notification routine end report has been received (step S26.5). The notification routine is executed by the notification section 51A of the monitoring device 50. The notification routine end report is transmitted by the notification section 51A after the notification routine has ended.

If the transaction device controller 41 determines that the notification routine end report has not been received at step S26.5 (step S26.5: YES), the transaction device controller 41 repeats step S26.5, and repeats the determination as to whether or not the notification routine end report has been received.

If the transaction device controller 41 determines that the notification routine end report has been received from the monitoring device 50 at step S26.5 (step S26.5: YES), the transaction device controller 41 displays a guidance message on the UI 14 (step S27). The guidance message may, for example, be a written message displayed to prompt the customer to seek assistance from a bank employee at a bank service counter, such as that illustrated in FIG. 7.

After executing step S27, the transaction device controller 41 operates the card reader-cum-printer to dispense the card through the card insertion/removal port 17, and ends the transaction control routine.

Notification Routine

Figure 11:
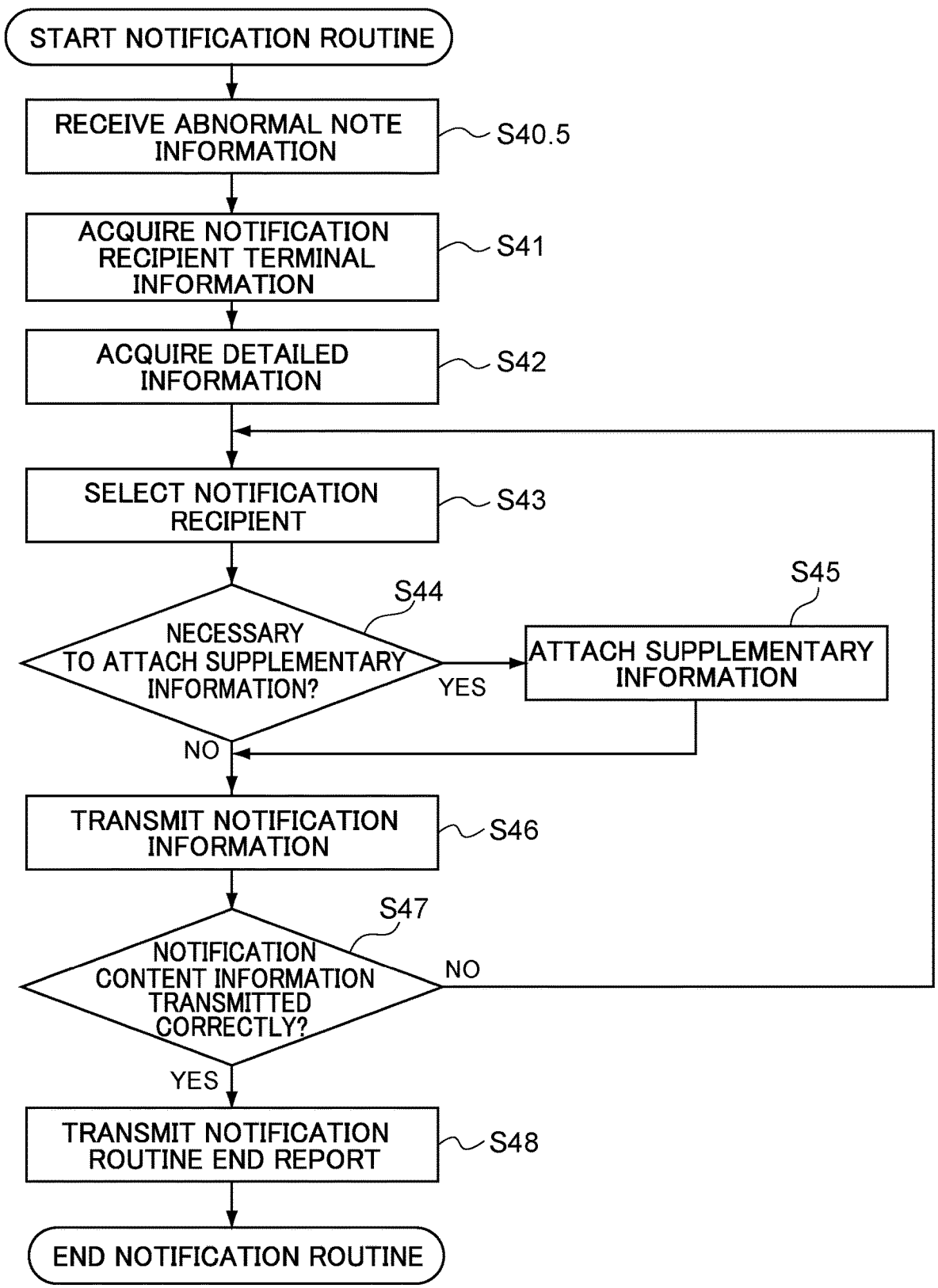
FIG. 11 is a flowchart illustrating a notification routine executed by an automated transaction system according to the second exemplary embodiment.

FIG. 11 illustrates the notification routine of the automated transaction system 30.

First, the notification section 51A, the notification section 51A receives the abnormal note information transmitted at step S22.5 (step S40.5).

Next, the notification section 51A acquires notification recipient terminal information from the notification recipient terminal DB 27 (step S41). The notification recipient terminal information is information relating to the terminals 26, for example terminal 26 address information, terminal 26 user information, and terminal 26 status information.

After the notification section 51A has executed step S41, the notification section 51A acquires detailed information, this being detailed information relating to the banknote that has been determined to be abnormal (step S42). The detailed information includes, for example, customer information such as the account number, the transaction type, the transaction value, and transaction history of the customer involved in the transaction in which the abnormal banknote was received. The detailed information may also include, for example, identification information such as the identification number of the ATM 40 that received the abnormal banknote.

At step S42, the notification section 51A may acquire the detailed information by, for example, acquiring customer data read by the card reader-cum-printer 16 of the transaction device 40 from the transaction device 40, and acquiring customer data stored in the host computer HC or the like.

After executing step S42, the notification section 51A selects a specific notification recipient terminal 26S from the terminals 26 (step S43).

At step S43, the notification section 51A selects the notification recipient terminal 26S based on the notification recipient terminal information selected at step S41 (step S43).

Selection of the notification recipient terminal 26S at step S43 may, for example, be performed based on supplementary information such as the abnormal note information acquired at step S40.5, the detailed information acquired at step S42, and the identification information such as the identification number of the ATM 40 that received the abnormal banknote, in addition to the notification recipient terminal information.

For example, in addition to the professional duties of the user of the terminal 26 included in the notification recipient terminal information, the notification section 51A may thus also select the notification recipient terminal 26S based on the transaction value when the abnormal banknote was inserted, as included in the abnormal note information. For example, in cases in which the abnormal banknote is a counterfeit note, if the counterfeit notes was inserted during a high value transaction, a terminal 26 used by a person responsible for high value transactions may be set as the notification recipient terminal 26S.

Moreover, for example, in addition to the professional duties of the user of the terminal 26 included in the notification recipient terminal information, the notification section 51A may also select the notification recipient terminal 26S based on the classification results for an abnormal banknote included in the abnormal note information. For example, in cases in which the abnormal banknote is a damaged note, a terminal 26 used by a person responsible for dealing with damaged notes may be selected, and in cases in which the abnormal banknote is a counterfeit note, a terminal 26 used by a person responsible for dealing with counterfeit notes may be selected as the notification recipient terminal 26S.

After executing step S43, when the notification section 51A notifies the specific notification recipient terminal 26 of the fact that an abnormal banknote has been received, the notification section 51A determines whether or not it is necessary to attach supplementary information (step S44). At step S44, for example, the notification section 51A may determine whether or not it is necessary to attach supplementary information based on information used in the selection at step S43. For example, supplementary information may be determined to be necessary in cases in which the customer is performing a high value transaction.

If the notification section 51A determines that it is necessary to attach supplementary information at step S44 (step S44: YES), in addition to the fact that an abnormal banknote has been received, supplementary information is attached as the notification content information configuring the content that is presented to the notification recipient terminal (step S45).

After executing step S45, the notification section 51A transmits the notification content information to the notification recipient terminal 26S selected at S43.

For example, when notification is performed by email, the notification section 51A may send an email including the supplementary information in addition to the fact that an abnormal banknote has been received. For example, in cases in which a counterfeit note has been received, the email text 26SA illustrated in FIG. 8 may be displayed on a display screen of the notification recipient terminal 26S. Note that the notification content information may also be transmitted as a text message or the like. The notification section 11A may also perform notification by making a telephone call to the terminal.

If the notification section 51A determines that it is not necessary to attach supplementary information at step S45 (step S44: NO), the fact that an abnormal banknote has been received is transmitted as notification content information without attaching supplementary information. For example, in cases in which notification is performed by email, the notification section 51A sends an email including the fact that an abnormal banknote has been received.

After executing step S46, the notification section 51A determines whether or not the notification content information has been transmitted correctly (step S47). For example, at step S47, the notification section 51A may determine whether or not the notification content information has been transmitted correctly based on a response from the specific notification recipient terminal 26S. For example, in cases in which notification is performed by email, it may be determined that the notification content information was not transmitted correctly if an email response saying the address does not exist is returned from the mail server.

If the notification section 15A determines that the notification content information has not been transmitted correctly at step S47 (step S47: NO), the notification section 51A repeats step S43, and repeats selection of the specific notification recipient terminal 26S. When step S43 is executed after step S47 has been executed, for example, the terminal 26 to which the notification content information was not transmitted correctly may be excluded when repeating the selection of the specific notification recipient terminal 26S.

If the notification section 11A determines that the notification content information was transmitted correctly at step S47 (step S47: YES), a notification routine end report, this being a signal to report that the notification routine has ended, is transmitted to the ATM 40 (step S48), and the notification routine is ended.

In the present exemplary embodiment, explanation has been given regarding an example in which the notification recipient terminal DB 27 is connected to the network NW. However, the notification recipient terminal DB 27 may be provided in a server external to the ATMs 40, in the host computer HC, within the ATMs 40, or within the monitoring device 50. It is sufficient that the notification recipient terminal DB 27 be connected so as to enable the notification section 51A to acquire information from the notification recipient terminal DB 27.

An example has been given in which the automated transaction device according to the present invention is applied to an Automated Teller Machine (ATM). However, the automated transaction device according to the present invention may be applied to other banknote-handling devices. For example, application may be made to a teller-casher or a banknote counting machine. The automated transaction device according to the present invention may also be applied to devices that handle other media, for example devices that handle checks, securities, or coins. Namely, application may be made to an automated transaction device that, on insertion of a medium such as a check, a security, or a coin, determines whether or not the medium is abnormal, and selects and notifies a specific notification target.

In the first and second exemplary embodiments described above, explanation has been given regarding examples in which the network NW is a communication line such as a LAN or a public communication network (public network). However, the network NW may be dedicated line confined to within a bank's own system.

Explanation has been given regarding examples in which the supplementary information includes counterfeit note information, customer information, and identification information. However, the supplementary information may include other information. For example, the supplementary information may include image information of the vicinity of the automated transaction device (or a user) as captured by a security camera.

Note that the various configurations and routines of the exemplary embodiments described above are merely examples, and may be selected or modified as appropriate so as to be adapted to suit their purpose.

As described in detail above, the automated transaction device, monitoring device, and automated transaction system including the automated transaction device and the monitoring device of the present invention are capable of selecting a specific notification recipient terminal from plural terminals based on notification recipient terminal information stored in the notification recipient terminal DB, and notifying the specific notification recipient terminal, when a banknote inserted into the automated transaction device during a transaction has been determined to be abnormal. Moreover, the selection of the specific notification recipient terminal may be performed based on supplementary information, for example abnormal note information, customer information, and identification information of the automated transaction device, in addition to the notification recipient terminal information. Moreover, the notification content information presented to the notification recipient terminal may include this supplementary information in addition to the fact that the automated transaction device has received an abnormal banknote.

Accordingly, the automated transaction device, monitoring device, and automated transaction system including the automated transaction device and the monitoring device of the present invention are capable of selecting the most appropriate notification recipient terminal according to the circumstances in which an abnormal banknote was received in cases in which a banknote inserted into the automated transaction device has been determined to be abnormal. This thereby enables the user of the most appropriate notification recipient terminal to be notified swiftly. Moreover, by presenting the supplementary information on the notification recipient terminal, the user of the terminal can be swiftly furnished with detailed information regarding the circumstances. This enables an automated transaction device and automated transaction system to be provided that create an environment to swiftly ascertain the circumstances and implement a swift and appropriate response when an abnormal banknote has been received by the automated transaction device.

The disclosure of Japanese Patent Application No. 2016-162380 is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. An automated transaction device configured to communicate with a plurality of terminals, each terminal being assigned to one of a plurality of users, the automated transaction device comprising:
   a medium insertion port that accepts insertion of a medium from a customer;
   a determination section that determines whether or not the inserted medium is abnormal; and
   a notification section that, responsive to determination by the determination section that the inserted medium is abnormal,
      obtains notification recipient terminal information of each of the terminals, the notification recipient terminal information including
         an identification of said each terminal,
         an address of said each terminal,
         user information of the user to whom said each terminal is assigned, and
         a status of said each terminal,
      selects a specific terminal from the plurality of terminals using at least one of the user information for each of the terminals and the status for each of the terminals, and
      notifies the selected specific terminal, using the identification and the address of the specific terminal, that the determination section has determined the inserted medium to be abnormal.

2. The automated transaction device of claim 1, wherein the notification section selects the specific terminal based further on abnormal medium information configured by information relating to the medium that has been determined to be abnormal.

3. The automated transaction device of claim 2, wherein the abnormal medium information includes a serial number of the medium that has been determined to be abnormal.

4. The automated transaction device of claim 1, wherein the notification section selects the specific terminal based further on customer information configured by information relating to the customer who inserted the medium that has been determined to be abnormal.

5. The automated transaction device of claim 1, wherein the automated transaction device has identification information, and the notification section selects the specific terminal based further on the identification information.

6. The automated transaction device of claim 1, wherein the status of each terminal includes a power source status of said each terminal and a distance between said each terminal and the automated transaction device.

7. The automated transaction device of claim 2, wherein the abnormal medium information includes at least two of
- a type of medium that has been determined to be abnormal,
- a number of media that have been determined to be abnormal, and
- a serial number of the medium that has been determined to be abnormal, and the notification section presents the specific terminal with at least some of the information included in the abnormal medium information as well as notifying the specific terminal.

8. The automated transaction device of claim 4, wherein the customer information includes at least two of
- a name,
- an account number,
- a transaction type,
- a transaction value which is a total number of media inserted by the customer, and
- a transaction history, of the customer, and
the notification section presents the specific terminal with at least some of the information included in the customer information as well as notifying the specific terminal.

9. The automated transaction device of claim 1, wherein the identification information includes at least two of
- a device number of the automated transaction device,
- an installation location of the automated transaction device, and
- a branch number of an institution where the automated transaction device is installed, and the notification section presents the specific terminal with at least some of the information included in the identification information as well as notifying the specific terminal.

10. An automated transaction device according to claim 1 further comprising:
an interface section that displays a message requesting the customer to wait, or a message prompting the customer to seek assistance from one of the users, when the inserted medium is determined to be abnormal.

11. The automated transaction device of claim 1, wherein the notification section assigns a priority level to each of the plurality of terminals based on the notification recipient terminal information, and selects one of the terminals to which the highest priority level is assigned to be the specific terminal.

12. The automated transaction device of claim 1, wherein the status of each terminal includes an operation status indicating a distance between the automated transaction device and said each terminal.

13. The automated transaction device of claim 12, wherein the notification section selects one of the terminals that has a shortest distance among all of the terminals as the specific terminal.

14. An automated transaction device configured to communicate with a plurality of terminals, each terminal being assigned to one of a plurality of users, the automated transaction device comprising:
a medium insertion port that accepts insertion of a medium from a customer;
a determination section that determines whether or not the inserted medium is a counterfeit note;
a notification section that, responsive to determination by the determination section that the inserted medium is abnormal,
obtains notification recipient terminal information of each of the terminals, the notification recipient terminal information including
an identification of said each terminal,
an address of said each terminal,
user information of the user to whom said each terminal is assigned, and
a status of said each terminal,
selects a specific terminal from the plurality of terminals using at least one of the user information for each of the terminals and the status for each of the terminals, and
notifies the selected specific terminal, using the identification and the address of the specific terminal, that the determination section has determined the inserted medium to be abnormal; and
a printing section that prints and outputs a transaction outcome on a receipt, wherein
a transaction value, from which a value of the medium that has been determined to be abnormal is subtracted, is printed on the receipt as the transaction outcome.

15. A device that is configured to communicate with an automated transaction device and to communicate with a plurality of terminals, each terminal being assigned to one of a plurality of users, the device comprising:
a reception section that receives a determination result of counterfeit note from the automated transaction device when the automated transaction device determines that a medium inserted from a customer is a counterfeit note;
a notification section that, responsive to receipt of the determination result,
obtains notification recipient terminal information of each of the terminals, the notification recipient terminal information including
an identification of said each terminal,
an address of said each terminal,
user information of the user to whom said each terminal is assigned, and
a status of said each terminal,
selects a specific terminal from the plurality of terminals using at least one of the user information for each of the terminals and the status for each of the terminals, and
notifies the specific terminal, using the identification and the address of the specific terminal, that the determination result of counterfeit note is received by the reception section.

* * * * *